United States Patent
Farnsworth

(10) Patent No.: US 8,033,955 B2
(45) Date of Patent: Oct. 11, 2011

(54) METHODS AND SYSTEMS FOR REGULATING HILL DESCENT SPEED OF AN ELECTRIC VEHICLE

(75) Inventor: Jared Michael Farnsworth, Sacramento, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 848 days.

(21) Appl. No.: 12/043,443

(22) Filed: Mar. 6, 2008

(65) Prior Publication Data

US 2009/0227418 A1    Sep. 10, 2009

(51) Int. Cl.
*F16H 15/01* (2006.01)
*B60K 1/00* (2006.01)
*B60T 8/64* (2006.01)

(52) U.S. Cl. .......... 477/7; 180/65.31; 303/152

(58) Field of Classification Search .......... 477/3, 4, 477/7, 186, 188; 180/65.1, 65.31; 701/22, 701/93; 303/20, 152
See application file for complete search history.

(56) References Cited

U.S. PATENT DOCUMENTS

| | | | |
|---|---|---|---|
| 3,630,304 A * | 12/1971 | Sahinkaya | 180/179 |
| 4,495,449 A * | 1/1985 | Black et al. | 318/60 |
| 4,658,939 A | 4/1987 | Kircher et al. | |
| 4,867,288 A * | 9/1989 | Simonyi et al. | 477/186 |
| 5,323,318 A | 6/1994 | Hasegawa et al. | |
| 6,122,588 A | 9/2000 | Shehan et al. | |
| 6,179,395 B1 | 1/2001 | Schneider | |
| 6,325,470 B1 | 12/2001 | Schneider | |
| 6,364,434 B1 * | 4/2002 | Sway-Tin et al. | 303/152 |
| 7,034,482 B2 * | 4/2006 | Komiyama et al. | 318/376 |
| 7,104,617 B2 * | 9/2006 | Brown | 303/152 |
| 2001/0032040 A1 * | 10/2001 | Albert et al. | 701/22 |
| 2003/0184147 A1 | 10/2003 | Perach | |
| 2007/0067085 A1 | 3/2007 | Lu et al. | |

FOREIGN PATENT DOCUMENTS

EP    37564    10/1981

* cited by examiner

*Primary Examiner* — Roger Pang
(74) *Attorney, Agent, or Firm* — Dinsmore & Shohl LLP

(57) ABSTRACT

A method for regulating the speed at which an electric vehicle descends a hill includes determining a position of a shift lever and determining if the vehicle accelerator and/or the vehicle brake are depressed. If the vehicle is in either drive or reverse and neither the vehicle accelerator nor the vehicle brake is depressed, a change in the motor speed is determined based on the current motor speed and a reference motor speed. The current braking assist is then adjusted based on the change in the motor speed such that the motor speed, and therefore the speed of the electric vehicle, remains constant as the vehicle descends the hill.

20 Claims, 4 Drawing Sheets

METHODS AND SYSTEMS FOR REGULATING HILL DESCENT SPEED OF AN ELECTRIC VEHICLE

TECHNICAL FIELD

The present invention generally relates to control logic for electric vehicles and, more specifically, to methods and systems for regulating speed of an electric vehicle.

BACKGROUND

Current systems for regulating the speed of an electric vehicle during hill descent utilize a variety of different methods, such as regenerative braking, to supplement vehicle braking and thereby prevent the vehicle's brakes from overheating and possibly failing. The current braking assist methods generally require driver interaction to actuate and/or control the braking assist provided by the method. For example, the driver may have to activate the braking assist method and set and/or modify the level of braking assist according to terrain and/or road conditions. Further, some braking assist methods may only have one braking assist level which is applied to supplement the vehicle braking. As a result, the braking assist may be incorrectly applied or the level of braking assist may be improperly set for the specific conditions (e.g., too much or too little) which may create dangerous driving situations.

Accordingly, a need exists for a method and system for automatically regulating the speed of an electric vehicle during hill descent.

SUMMARY

In one embodiment, a method for regulating the hill descent speed of an electric vehicle may include determining if a freewheel condition exists. The speed of the electric motor may then be compared to a threshold value. If a freewheel condition exists and the speed of the electric motor is greater than a threshold value then a change in the motor speed is determined. When a change in the motor speed is determined, the current braking assist may be adjusted based on the determined change in the motor speed such that the speed of the motor is restored to a reference motor speed. In this manner, the speed of the electric vehicle may be regulated as the vehicle descends a hill.

In another embodiment, a method for regulating the hill descent speed of an electric vehicle may include determining the position of a shift lever, determining if a brake pedal and an accelerator pedal are depressed and determining if a motor speed is greater than a threshold value. If the shift lever is in either drive or reverse, neither the brake pedal nor the accelerator pedal is depressed, and the speed of the electric motor is greater than the threshold value, a change in the motor speed may then be determined. The change in the motor speed may be determined based on a comparison of the current motor speed to a reference motor speed and a comparison of the current braking assist to the maximum allowable braking assist and/or a base braking assist. The current braking assist may then be adjusted based on the determined change in motor speed such that the speed of the vehicle is regulated as the vehicle descends the hill.

In another embodiment, a system for regulating the hill descent speed of an electric vehicle may include a motor speed/position sensor, a brake pedal position sensor, a accelerator pedal position sensor, and a shift lever position sensor each of which are operatively coupled to a controller. The controller may be programmed to regulate the hill descent speed of the vehicle by selectively apply braking assist based on signals received from the motor speed/position sensor, the brake pedal position sensor, the accelerator position sensor, and the shift lever position sensor such that the hill descent speed of the vehicle may be regulated.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE ILLUSTRATIVE EMBODIMENTS

Figure 1:
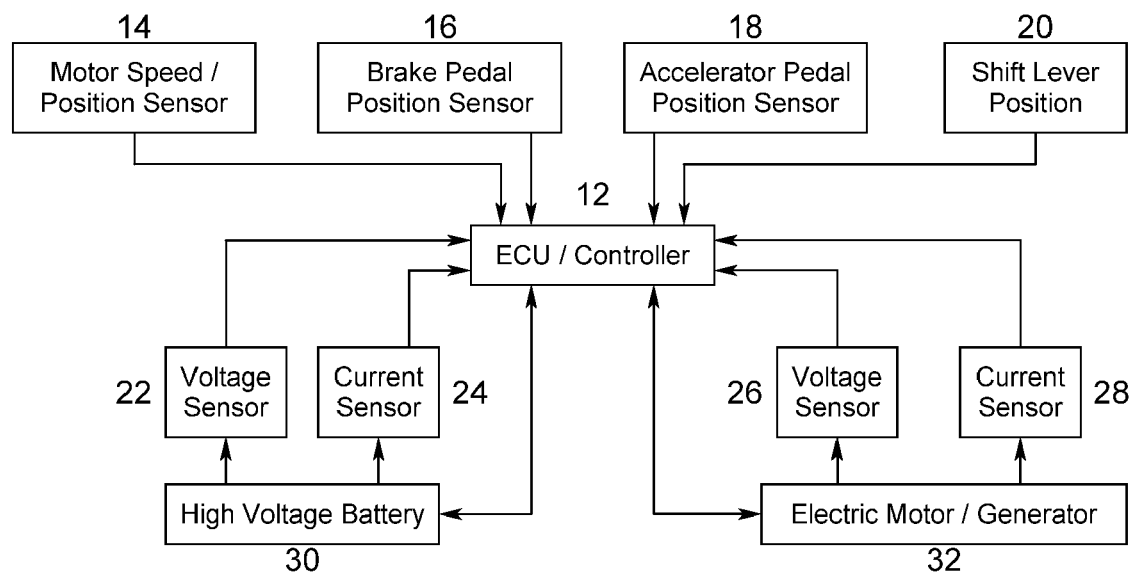
FIG. 1 depicts a schematic diagram of a system for regulating the hill descent speed of an electric vehicle according to one embodiment described herein.

FIG. 1 generally depicts a system for carrying out the method of regulating the hill descent speed of an electric vehicle according to one embodiment described herein. The system and method regulate the speed of the vehicle during hill descent via the automatic application of braking assist thereby improving vehicle safety and reducing wear on mechanical braking components. The system for regulating the hill descent speed of an electric vehicle may generally comprise a controller or electronic control unit (ECU), an electric motor/generator, a high voltage battery, a motor speed and or position sensor, a brake pedal position sensor, an accelerator position sensor, and a shift lever position sensor. Each of these elements and the operation of the system will be described in more detail herein.

Referring now to FIG. 1, an embodiment of a system 10 for controlling the speed of an electric vehicle during hill descent is shown. The system may include a stand-alone logic controller such as an electronic control unit (ECU) 12 or similar controller. In one embodiment, the ECU 12 may consist of a plurality of discrete controllers interconnected with one another. In another embodiment, the ECU 12 may be integral with another controller or a control unit. The ECU 12 is operatively connected to a motor speed/position sensor 14, a brake pedal position sensor 16, an accelerator position sensor 18, and a shift lever position sensor 20.

The ECU 12 may also be electrically connected to a high voltage battery 30 or a similar energy storage device such as a capacitor bank, or the like. A voltage sensor 22 and current sensor 24 may be electronically connected to the high voltage battery 30 and operatively connected to the ECU 12 such that the voltage and current of the high voltage battery 30 are transmitted to the ECU 12. The ECU 12 may receive signals from each of the voltage sensor 22 and current sensor 24. The ECU 12 may also control the charging and discharging of the high voltage battery 30.

The ECU 12 may also be electrically connected to an electric motor/generator 32 which may be, in turn, mechanically connected to the transmission (not shown) of the vehicle (not shown). A voltage sensor 26 and current sensor 28 may be electronically connected to the electric motor/generator 32 and operatively connected to the ECU 12 such that the voltage and current of the high voltage battery 30 are transmitted to the ECU 12 via signals from each of the voltage sensor 26 and current sensor 28. The electric motor/generator 32 may perform multiple functions under the control of the ECU 12. In one respect, the electric motor/generator 32 provides the motive power for the vehicle. In another respect, the electric motor/generator 32 may utilize the motion of the vehicle, specifically the motion of the wheels of the vehicle, to generate electricity which, in turn, is stored in the high voltage battery 30. In still another respect, the electric motor/generator 32 and the high voltage battery 30, together, form a regenerative braking system which may be used to assist vehicle braking.

It should be understood that the arrows showing the interconnectivity of the various components of the system 10 in FIG. 1 are also indicative of signals relayed to and from the ECU 12 by the various components of the system 10.

In the embodiment of the system 10 for controlling vehicle hill descent speed depicted in FIG. 1, the ECU 12 may be programmed to selectively apply braking assist based on signals received from the motor speed/position sensor 14, the brake pedal position sensor 16, the accelerator pedal position sensor 18 and the shift lever position sensor 20. Based upon input signals received from these various sensors, the ECU 12 may control the output of the motor/generator 32, and, more specifically, the output of the generator function of the motor/generator 32, to selectively apply braking assist via the controlled application of regenerative braking thereby selectively regulating the speed of the electric vehicle including the hill descent speed of the electric vehicle. Accordingly, it should be understood that the system 10 shown in FIG. 1 is representative of a system for selectively controlling the application of braking assist and, more specifically, a system for selectively applying regenerative braking.

While the system 10 depicted in FIG. 1 is specifically configured for the controlled application of regenerative braking, it should be understood that the systems and methods described herein may utilize other forms of braking assistance to control the hill descent speed of an electric vehicle. For example, the control system depicted in FIG. 1 may be adapted for use in conjunction with dynamic braking, engine braking, or other braking assist techniques as will be apparent to one skilled in the art.

Figure 2:
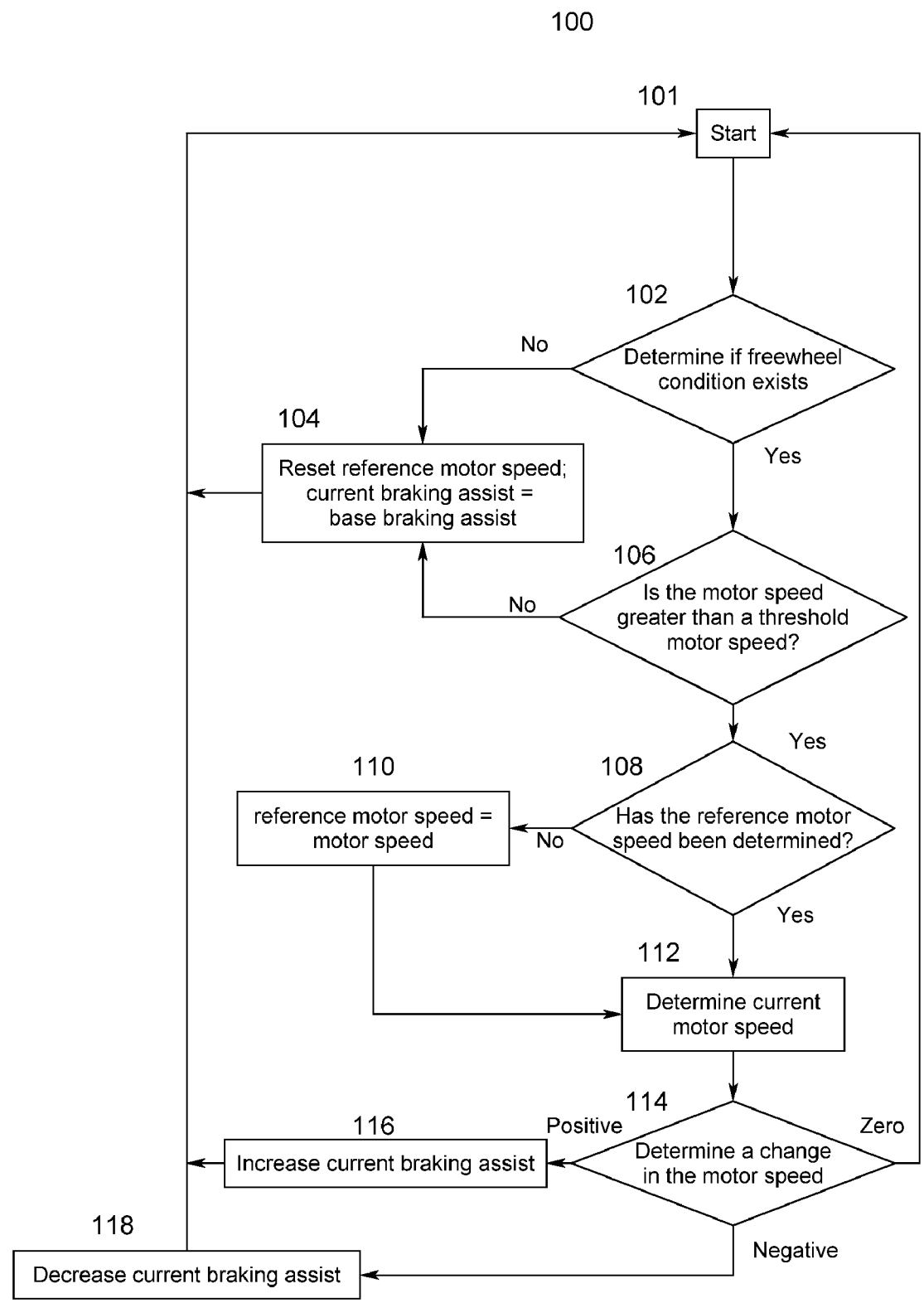
FIG. 2 depicts a flow diagram of a method for regulating the hill descent speed of an electric vehicle according to one embodiment described herein.
Figure 3:
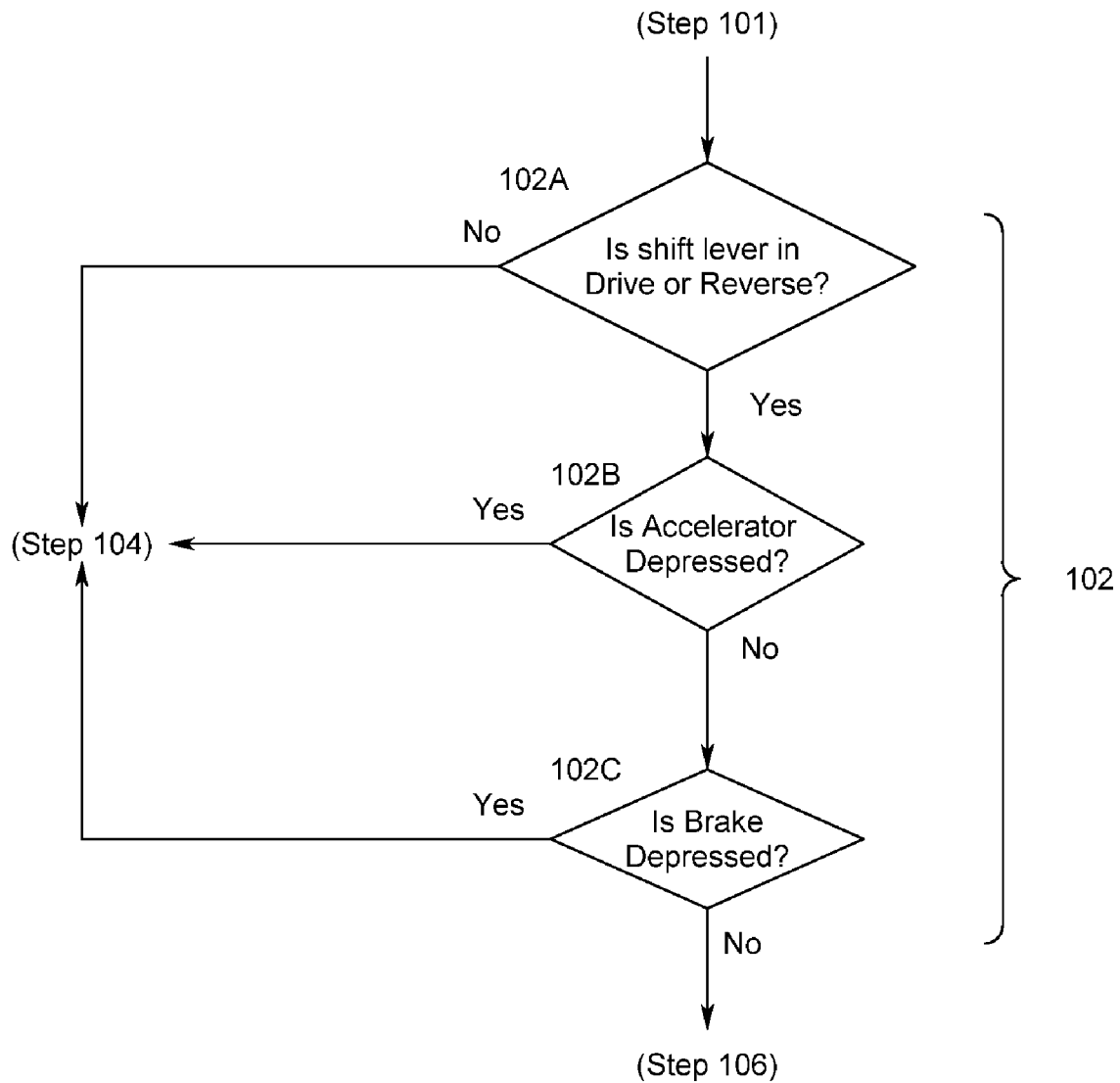
FIG. 3 depicts a flow diagram of the steps of determining if a freewheel condition exists according to one embodiment of the method for regulating the hill descent speed of an electric vehicle.
Figure 4:
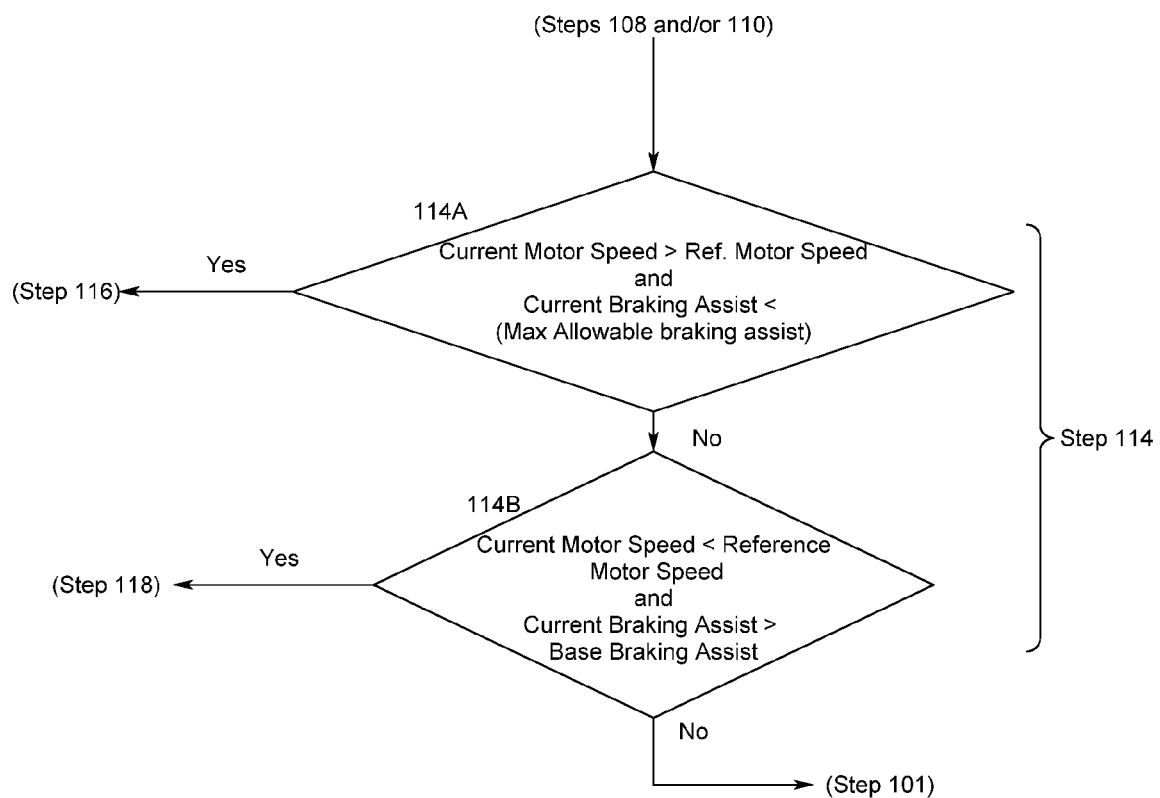
FIG. 4 depicts a flow diagram of the steps of determining the change in the motor speed of a vehicle according to one embodiment of the method for regulating the hill descent speed of an electric vehicle.

Referring now to FIGS. 2-4, a flow diagram of one embodiment of a method 100 for regulating the hill descent speed of an electric vehicle is depicted. The method 100 may regulate the hill descent speed of an electric vehicle through the selective control and application of braking assist. For example, where an electric vehicle includes a regenerative braking system, the method 100 may regulate the hill descent speed of the electric vehicle through the selective control and application of regenerative braking. However, it will be understood that the method 100 may be used to selectively control and apply a variety of other braking assist techniques as will be apparent to one skilled in the art.

The method 100 may be included as a logic loop in a vehicle controller such as the ECU 12 depicted in FIG. 1. The method 100 may be triggered when the vehicle ignition is switched to the "on" position and may terminate when the vehicle ignition is switched to the "off" position. When the vehicle is switched from the "off" position to the "on" position the variables used in the method (e.g., reference motor speed, current braking assist, and the like) may be initialized prior to the start of the method at step 101. The method 100 may begin with step 102 where a determination may be made as to whether a freewheel condition exists with respect to the vehicle. For example, a freewheel condition may exist when the vehicle wheels are driving the motor, such as when the vehicle is in motion without torque being applied to the wheels by the motor. Accordingly, a freewheel condition may exist when the shift lever of the vehicle is in either drive or reverse and the vehicle is in motion but no torque is applied to the wheels via the motor. Similarly, a freewheel condition may exist if the wheels of the vehicle are free to rotate and/or accelerate without the assistance or influence of either the motor or vehicle braking system. If a freewheel condition does not exist, the method 100 proceeds to step 104 and, thereafter, loops back to the beginning. If a freewheel condition does exist, the method 100 continues on to step 106.

In one embodiment, the step of determining if a freewheel condition exists (step 102) may comprise multiple steps, such as steps 102A, 102B, 102C shown in FIG. 3. In step 102A, the position of the shift lever may be determined based on a signal from the shift lever position sensor to the ECU. If the shift lever is positioned to drive the vehicle in either a forward or reverse direction (e.g., the shift lever is positioned in drive, reverse, low, 1, 2, 3 or the like), the method continues on to step 102B. If the shift lever is not positioned to drive the vehicle in either a forward or reverse direction (e.g., the shift lever is positioned in park or the like), the method proceeds to step 104. In step 102B the position of the accelerator pedal may be determined based upon a signal from the accelerator pedal position sensor to the ECU. If the vehicle accelerator is depressed, the method 100 proceeds to step 104. If the vehicle accelerator is not depressed, the method continues to step 102C where the position of the vehicle brake pedal may be determined based upon a signal from the brake pedal position sensor. If the vehicle brake pedal is depressed, the method 100 proceeds to step 104. If the vehicle brake pedal is not depressed, the method 100 continues on to step 106. Accordingly, the vehicle may be in a freewheel condition when the shift lever is either in drive or reverse and neither the accelerator pedal nor the brake pedal are depressed. Further, it should be understood that, when either the accelerator pedal or the brake pedal of the vehicle is depressed, the driver is actively controlling the speed and acceleration of the vehicle. As such, there is no need to regulate the vehicle speed through the application of supplemental braking assist.

Step 104 may act as a reset step when one of the freewheel conditions of step 102 is not met or the vehicle speed, as indicated by the motor speed, (determined in step 106 and discussed further herein) is not greater than a threshold motor speed. In step 104 the reference motor speed is reset to its initialized value. Also in step 104 the current braking assist (discussed further herein) is set to equal the base braking assist (also discussed further herein) such that no additional braking assist is applied to the electric vehicle.

In step 106 the motor speed may be determined based on an input signal from the motor speed/position sensor to the ECU and compared to a threshold motor speed. It should be understood that the motor speed, as determined by the ECU from the motor speed/position sensor, may be indicative of the speed of the vehicle. Accordingly, increasing or decreasing the speed of the vehicle may cause a corresponding increase or decrease in the speed of the motor. In one embodiment, the threshold motor speed value may be a predetermined, constant motor speed corresponding to a safe operating speed of the vehicle. In another embodiment, the threshold motor speed may be dynamically determined based on variables such as road condition, vehicle attitude, available braking assist and the like. When the motor speed is less than the threshold value, the vehicle is moving at a slow speed and vehicle braking assist may not be needed and/or desired. The method 100 may then proceed to step 104. However, if the motor speed is greater than the threshold value, the method continues on to step 108.

It should be understood that the order of steps 102 and 106 is illustrative in nature and that steps 102 and 106 may be performed in any order as will be apparent to one skilled in the art. Accordingly, no particular limitation is intended as to the order in which steps 102 and 106 are performed.

In step 108 it is determined if the reference motor speed has been previously determined, such as in a previous loop of the method. For example, if either of the brake pedal or the accelerator pedal have been depressed since the initial assessment of the freewheel condition in step 102, the reference motor speed may have been reset in step 104 and, therefore, the reference motor speed may need to be determined. If the reference speed has not been determined, the method proceeds to step 110. If the reference speed has been previously determined (i.e. the value of the reference speed is different that its initialized value), then the method proceeds to step 112.

In step 110 the speed of the motor/generator may then be determined based on the signal received by the ECU from the motor speed/position sensor. The reference motor speed is then set to the motor speed. The method then proceeds to step 112.

In step 112 the motor speed may then be determined based on the signal received by the ECU from the motor speed/position sensor. The current motor speed may then be set to the motor speed.

In step 114 a change in the motor speed of the vehicle may be determined based on the difference between the reference motor speed and the current motor speed. In one embodiment, the difference in the motor speed may be determined by subtracting the reference motor speed from the current motor speed. Accordingly, when the current motor speed is greater than the reference motor speed, the vehicle is accelerating and the change in the motor speed has as positive value. However, when the motor speed is less than the reference motor speed the vehicle is decelerating and the change in the motor speed has a negative value. When the motor speed of the vehicle remains constant, (e.g., when the current motor speed is equal to the reference motor speed) the vehicle is neither accelerating or decelerating and the change in the motor speed is zero. If the change in the motor speed is positive the method proceeds to step 116. If the vehicle has a negative acceleration, the method proceeds to step 118. If the change in motor speed is zero, the method loops back to the start 101 and is repeated.

In one embodiment, determining the change in motor speed may be performed in a series of steps, such as steps 114A and 114B shown in FIG. 4. In steps 114A and 114B the change in motor speed may be determined by comparing the motor speed of the vehicle to the reference motor speed and the current braking assist to the maximum allowable braking assist and/or the base braking assist.

It should be understood that braking assist, as used herein, may refer to the use of braking techniques to decrease the speed of a vehicle in addition to or instead of the vehicles mechanical brakes. Braking assist may include regenerative braking, dynamic braking, engine braking, or other braking assist techniques as will be apparent to one skilled in the art. As noted herein, while specific reference is made to the application and use of braking assist in conjunction with regenerative braking systems, it should be understood that the methods disclosed herein may be equally applicable for the application and control of other braking assist techniques.

The maximum allowable braking assist, as used herein, may refer to the maximum amount of braking assist available to slow the speed and/or acceleration of the vehicle. For example, when braking assist constitutes the use of a regenerative braking system to slow the speed of the vehicle without the use of mechanical brakes or as a supplement to mechanical brakes, the maximum allowable braking assist refers to the maximum amount of regenerative braking (in units of power, torque, or equivalent units of measure) that may be used to slow the vehicle based on the current amount of energy stored in the vehicle's batteries or similar energy storage devices. If, for example, the vehicle's batteries are fully charged, the maximum allowable braking assist that may be provided by the regenerative braking system is zero. However, if the vehicle's batteries are only partially charged, the maximum amount of vehicle braking assist available is equivalent to the amount of power (or an equivalent unit of measure) necessary to fully charge the vehicle's batteries. For a regenerative braking system, maximum available braking assist may vary depending on the temperature of the motor, the battery temperature, the battery capacity, the speed of the vehicle, and the like.

The base braking assist, as used herein, may refer to the nominal amount of braking assist for the vehicle. For example, a vehicle with a regenerative braking system may be set to generate power when the accelerator pedal is not depressed and, therefore, has a base braking assist. In other vehicles the base braking assist may be zero.

The current braking assist, as used herein, may refer to the amount of braking assist currently applied to slow the speed of the vehicle. For example, in vehicles having a regenerative braking system where a threshold amount of regenerative braking occurs anytime the accelerator is not depressed, the current braking assist may be the base braking assist.

Still referring to FIG. 4, in one embodiment, the step of determining the change in motor speed of the vehicle (step 114) may comprise steps 114A and 114B. In step 114A a positive change in the motor speed may be determined by comparing the current motor speed to the reference motor speed and the current braking assist to the maximum allowable braking assist. If the current motor speed is greater than the reference motor speed and the current braking assist is less than the maximum allowable braking assist, the change in the motor speed is positive and the method proceeds to step 116. If the current motor speed is less than the reference motor speed or the current braking assist is greater than the maximum allowable braking assist the method proceeds to step 114B.

In step 114B a negative change in motor speed may be determined by comparing the current speed of the motor to the reference motor speed and the current braking assist to the base braking assist. If the current motor speed is less than the reference motor speed and if the current braking assist is greater than the base braking assist, the change in the motor speed is negative and the method proceeds to step 118. If the current motor speed is greater than the reference motor speed or if the current braking assist is less than the base braking assist, the change in motor speed is zero and the method loops back to the starting point and the method 100 is repeated.

Referring again to FIG. 1, if the vehicle has a positive change in motor speed, as determined in step 114, the braking assist may be increased in step 116 such that the speed of the vehicle (and therefore the speed of the motor) is maintained at a constant value. In one embodiment, the braking assist may be increased in step 116 until the speed of the vehicle is constant (the acceleration is zero). In another embodiment, the amount of braking assist may be increased by a predetermined amount in order to arrest the acceleration of the vehicle and return the motor speed to the reference motor speed. In another embodiment, the amount of braking assist applied to the vehicle may be increased until the maximum available amount of braking assist is reached. In yet another embodiment, the amount of braking assist may be incrementally increased in step 116 until the motor speed is constant (the acceleration is zero) or until the maximum allowable braking assist is reached. In yet another embodiment, the amount the braking assist is increased as a function of at least one of the motor speed, acceleration, the maximum allowable braking assist, the base braking assist, and/or combinations thereof. In another embodiment, the braking assist is increased is determined from a look-up table (LUT). After the braking assist is increased in step 116, the method returns to the start and the steps of the method 100 are repeated.

When the change in motor speed is negative, as determined in step 114, the braking assist supplied to the vehicle may be decreased in step 118. In one embodiment, the current braking assist may be decreased in step 118 until the motor speed is constant (e.g., the acceleration of the vehicle is zero). In another embodiment, the current braking assist may be decreased until the speed of the motor is equal to the reference motor speed. In another embodiment, the braking assist may be decreased in step 118 by a predetermined amount until the motor speed equals the reference motor speed. After the braking assist is decreased in step 118 the method loops back to the start and the method is repeated.

Referring now to FIGS. 1 and 2, the steps of increasing the current braking assist (step 116) and decreasing the current braking assist (step 118) may be performed under the control of the ECU 12. For example, when the vehicle has a regenerative braking system, as shown schematically in FIG. 1, increasing the current braking assist may comprise switching the electric motor/generator 32 to generator mode and charging the high voltage battery 30 with the output of the generator such that the kinetic energy of the vehicle (e.g., the speed of the vehicle) is reduced and the motor speed is thereby decreased. By way of contrast, to decrease the current braking assist, the amount of energy supplied from the electric motor/generator 32 to the high voltage battery 30 may be decreased such that the reduction in the kinetic energy of the vehicle (e.g., the reduction in the speed of the vehicle) is mitigated.

It should now be understood that the methods and systems shown and described herein may be used in conjunction with electrically powered vehicles to regulate the speed of the vehicles and, more particularly, to regulate the hill descent speed of the vehicles. The method utilizes a looping logic structure to maintain the vehicle speed at a constant value. The methods and systems described herein may be easily incorporated into current vehicle designs using existing hardware and sensors already present in the vehicles. Accordingly, the methods and systems described herein may be introduced into vehicles without significant additional expense.

Moreover, the methods and systems shown and described herein provide a software-based solution to controlling electric vehicle hill-descent speed that may be used in conjunction with regenerative braking or in place of regenerative braking. The methods and systems are capable of controlling electric vehicle hill descent speed without user input or control. Accordingly, user errors are prevented. Further, because the methods and systems are implemented through a continuous software loop, the system response is both fast and automatic resulting in safer and more convenient vehicle operation on hills and grades.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A method for regulating the hill descent speed of an electric vehicle, the method comprising:
   determining if a freewheel condition exists;
   determining if a motor speed is greater than a threshold value;
   determining a change in the motor speed only when a freewheel condition exists and the motor speed is greater than a threshold value; and
   adjusting a current braking assist based on the determined change in the motor speed such that the motor speed is maintained at or restored to a reference motor speed thereby regulating the speed of the electric vehicle.

2. The method of claim 1 wherein a freewheel condition exists if a vehicle shift lever is in a position to drive the vehicle in a forward or reverse direction and neither of the vehicle brake pedal or the vehicle accelerator pedal is depressed.

3. The method of claim 1 wherein a freewheel condition exists if neither of the vehicle brake pedal or the vehicle accelerator pedal is depressed.

4. The method of claim 1 wherein the change in the motor speed is determined by subtracting a reference motor speed from a current motor speed and, when the determined change in the motor speed is positive, the current braking assist is adjusted by increasing the current braking assist or, when the determined change in motor speed is negative, the current braking assist is adjusted by decreasing the braking assist.

5. The method of claim 4 wherein when the change in the motor speed is positive, the current braking assist is increased up to the maximum allowable braking assist.

6. The method of claim 4 wherein, when the change in the motor speed is positive, the current braking assist is increased until the motor speed is equal to the reference motor speed.

7. The method of claim 4 wherein, when the determined change in the motor speed is negative, the current braking assist is decreased until the motor speed is equal to the reference motor speed.

8. The method of claim 1 wherein, to determine the change in the motor speed of the electric vehicle, a current motor speed is compared to a reference motor speed and the current braking assist is compared to a maximum allowable braking assist and/or a base braking assist.

9. The method of claim 8 wherein, to adjust the current braking assist, the current braking assist is increased when the current motor speed is greater than the reference motor speed and the current braking assist is less than the maximum allowable braking assist.

10. The method of claim 8 wherein, to adjust the current braking assist, the current braking assist is decreased when the current motor speed is less than the reference motor speed and the current braking assist is greater than a base braking assist.

11. The method of claim 1 wherein, to adjust the current braking assist, an amount of regenerative braking is either increased or decreased.

12. A method for regulating the hill descent speed of an electric vehicle, the method comprising:
   determining a position of a shift lever;
   determining if a brake pedal is depressed;
   determining if an accelerator pedal is depressed;
   determining if a motor speed is greater than a threshold value;
   determining a change in the motor speed only when the position of the shift lever is in a position to drive the vehicle in a forward or reverse direction, neither of the brake pedal or accelerator pedal are depressed, and the motor speed is greater than a threshold value, wherein determining a change in the motor speed comprises comparing a current motor speed to a reference motor speed and comparing a current braking assist to a maximum allowable braking assist and/or a base braking assist; and
   adjusting the current braking assist when the change in the motor speed is determined, wherein the current braking assist is adjusted based on the determined change in the motor speed such that the motor speed is maintained at or restored to the reference motor speed thereby regulating the speed of the electric vehicle.

13. The method of claim 12 wherein determining a change in the motor speed comprises subtracting the reference motor speed from the current motor speed.

14. The method of claim 13 wherein, when the change in the motor speed is positive the current braking assist is increased and when the change in motor speed is negative the current braking assist is decreased.

15. The method of claim 13 wherein, when the change in the motor speed is positive the current braking assist is increased up to the maximum allowable braking assist until the motor speed is equal to the reference motor speed.

16. The method of claim 13 wherein, when the change in motor speed is positive the current braking assist is increased until the motor speed is equal to the reference motor speed.

17. The method of claim 12 wherein, when the current motor speed is greater than the reference motor speed and the current braking assist is less than the maximum allowable braking assist, the current braking assist is adjusted by increasing the current braking assist.

18. The method of claim 12 wherein, when the current motor speed is less than the reference motor speed and the current braking assist is greater than a base braking assist, the current braking assist is adjusted by decreasing the current braking assist.

19. A control system for regulating the hill descent speed of an electric vehicle, the system comprising:
   a motor speed/position sensor that determines if a motor speed is greater than a threshold value;
   a brake pedal position sensor that determines if a brake pedal is depressed;
   an accelerator pedal position sensor that determines if an accelerator pedal is depressed;
   a shift lever position sensor that determines a position of a shift lever; and
   a controller, wherein the motor speed/position sensor, the brake pedal position sensor, the accelerator position sensor, and the shift lever position sensor are operatively connected to the controller and the controller is programmed to:
      determine a change in the motor speed only when a position of the shift lever is in a position to drive the vehicle in a forward or reverse direction, neither of the brake pedal or accelerator pedal are depressed, and the motor speed is greater than a threshold value, wherein determining a change in the motor speed comprises comparing a current motor speed to a reference motor speed and comparing a current braking assist to a maximum allowable braking assist and/or a base braking assist; and
      adjust the current braking assist when the change in the motor speed is determined, wherein the current braking assist is adjusted based on the determined change in the motor speed such that the motor speed is maintained at or restored to the reference motor speed thereby regulating the speed of the electric vehicle.

20. The system of claim 19 further comprising a regenerative braking system, the regenerative braking system comprising a motor/generator electrically connected to the controller and an energy storage device electrically connected to the controller and wherein the controller adjusts the current braking assist of the electric vehicle by selectively applying regenerative braking.

* * * * *